United States Patent [19]
Chen

[11] Patent Number: 5,547,086
[45] Date of Patent: Aug. 20, 1996

[54] VIDEO COMPACT DISK STORAGE RACK

[76] Inventor: Hui-Huang Chen, No. 105-1, Sec. 1, Chang Shui Rd., Pu Yen Hsiang, Changhwa Hsien, Taiwan

[21] Appl. No.: 438,341

[22] Filed: May 10, 1995

[51] Int. Cl.⁶ ........................................... A47F 7/00
[52] U.S. Cl. .................... 211/40; 211/43; 211/51
[58] Field of Search .................. 211/59.3, 51, 41, 211/40, 43, 182, 189

[56] References Cited

U.S. PATENT DOCUMENTS

| | | | |
|---|---|---|---|
| 3,114,459 | 12/1963 | Kersting | 211/40 X |
| 3,800,958 | 4/1974 | Dorn | 211/51 X |
| 4,231,175 | 11/1980 | Baxter | 211/51 X |
| 4,966,278 | 10/1990 | Rosi et al. | 211/40 X |
| 5,415,297 | 5/1995 | Klein et al. | 211/43 X |
| 5,437,376 | 8/1995 | Larsen | 211/40 |

Primary Examiner—Robert W. Gibson, Jr.
Attorney, Agent, or Firm—Varndell Legal Group

[57] ABSTRACT

A video compact disk storage rack including a first end member, a second end member, an open frame connected between the first end member and the second end member at the top, two connecting rods bilaterally connected between the first end member and the second end member at the bottom, two expansion springs mounted inside the open frame at two opposite sides, and two T-blocks respectively supported on the expansion springs and moved along two longitudinal sliding slots on the open frame at two opposite sides for holding down video compact disks within the open frame.

4 Claims, 5 Drawing Sheets

5,547,086

VIDEO COMPACT DISK STORAGE RACK

BACKGROUND AND SUMMARY OF THE INVENTION

The present invention relates to a video compact disk storage rack for keeping video compact disks in good roder.

Video compact disks have become more and more invited for the advantage of high reproduction quality. Video compact disks are commonly packed in an individual plastics case. When one owns a big number of video compact disks, one shall have to prepare a storage container to hold them in good order so that they can be quickly searched.

The present invention has been accomplished to provide a video compact disk storage rack which can be conveniently adjusted to keep video compact disks in good order for quick search. According to the present invention, the video compact disk storage rack is comprised of a first end member, a second end member, an open frame connected between the first end member and the second end member at the top, two connecting rods bilaterally connected between the first end member and the second end member at the bottom, two expansion springs mounted inside the open frame at two opposite sides, and two T-blocks respectively supported on the expansion springs and moved along two longitudinal sliding slots on the open frame at two opposite sides for holding down video compact disks within the open frame. Because the T-blocks are supported on the expansion springs and forced by them to hold down video compact disks within the open frame, stored video compact disks can be conveniently moved apart one after another for quick search.

DETAILED DESCRIPTION OF THE PREFERRED EMBODIMENT

Figure 1:
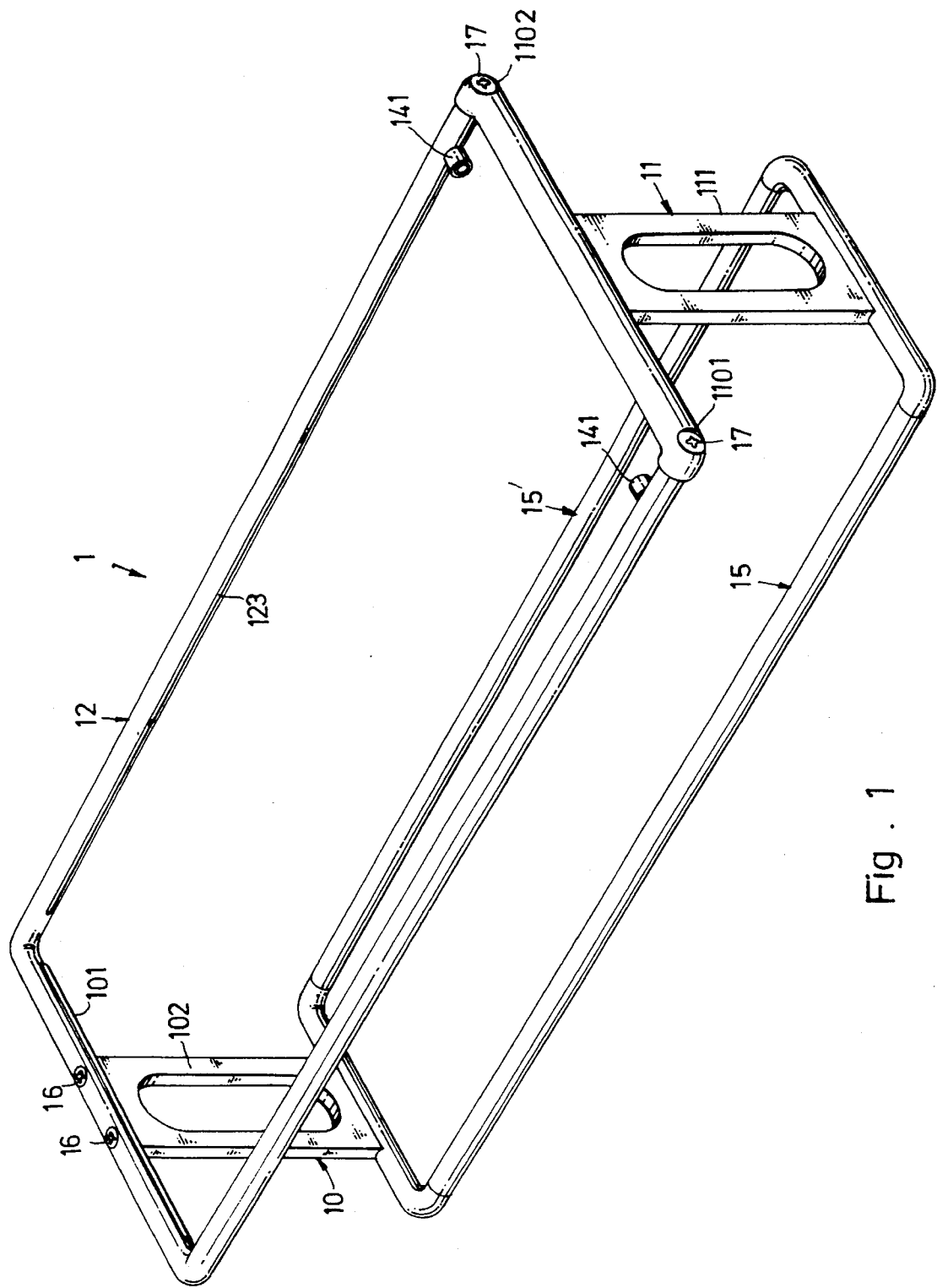
FIG. 1 is an elevational view of a video compact disk storage rack according to the present invention.
Figure 4:
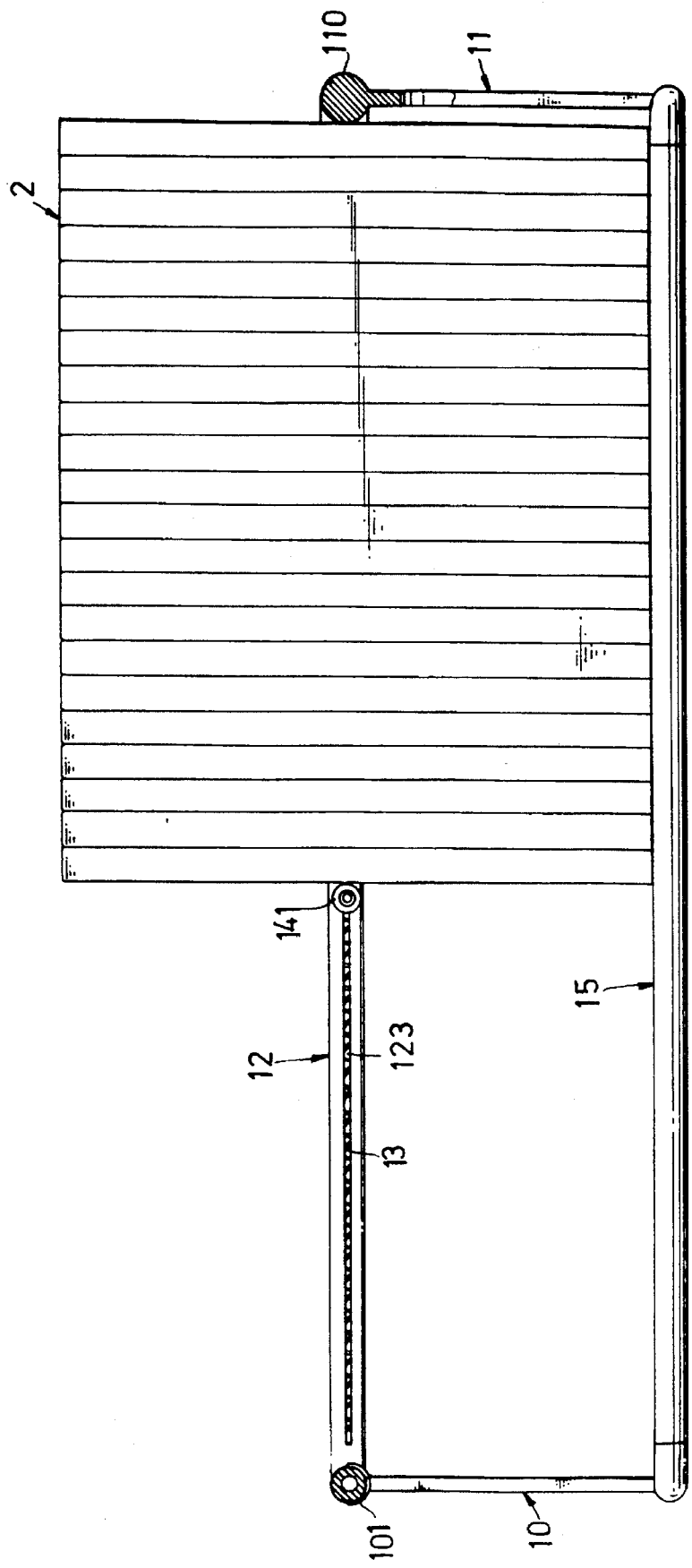
FIG. 4 is an applied view showing a plurality of video compact disks stored in the video compact disk storage rack according to the present invention.

Referring to FIG. 1, a video compact disk storage rack 1 in accordance with the present invention is generally comprised of a first end member 10, a second end member 11, an open frame 12 connected between the first end member 10 and the second end member 11 at the top, two connecting cods 15 and 15' bilaterally connected between the first end member 10 and the second end member 11 at the bottom, two expansion springs 13 mounted inside the open frame 12 at two opposite sides, and two T-blocks 14 respectively supported on the expansion springs 13 and forced by them to hold down video compact disks 2 within the open frame 12 (see also FIG. 4).

Figure 2:
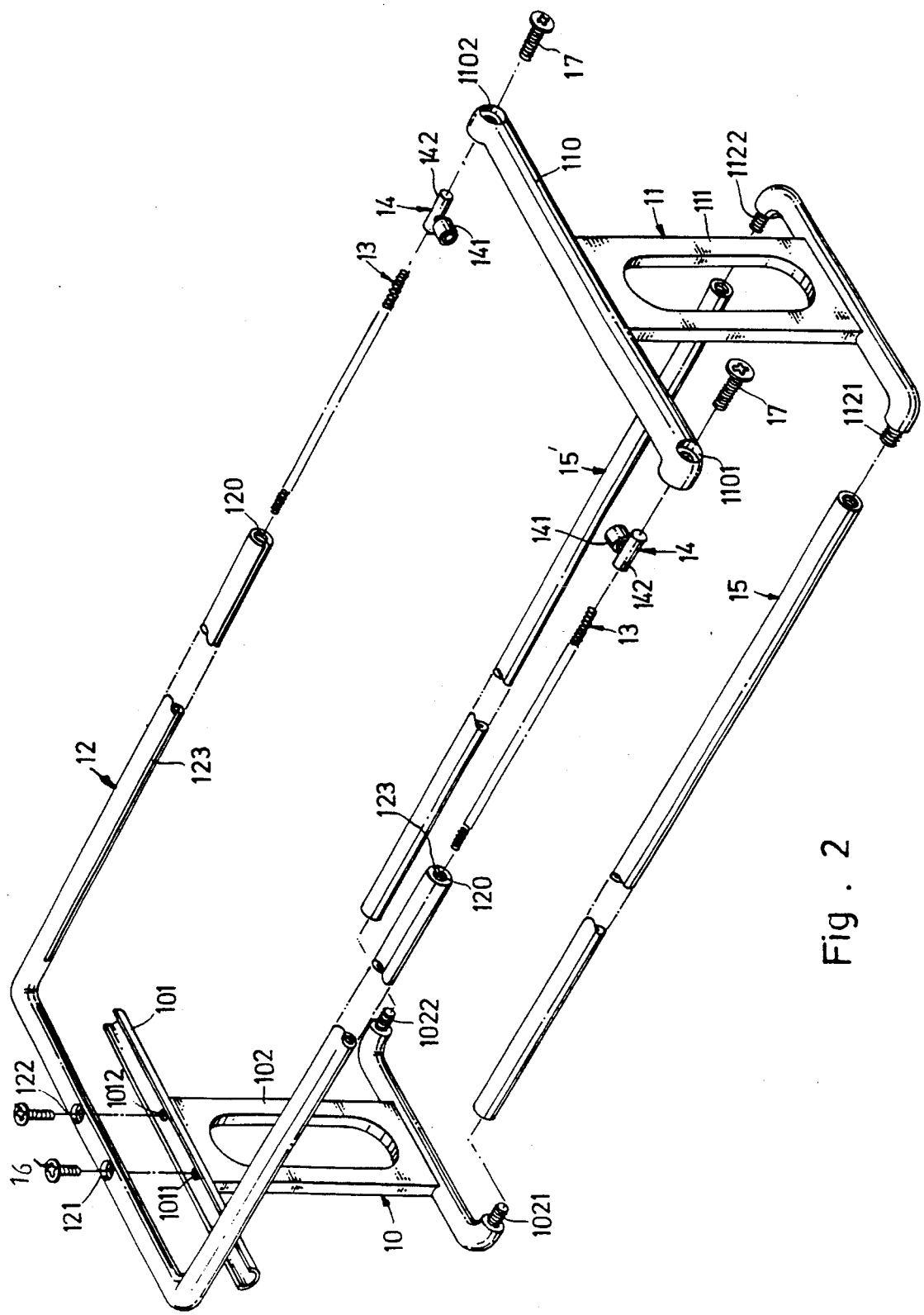
FIG. 2 is an exploded view of the video compact disk storage rack shown in FIG. 1.
Figure 3:
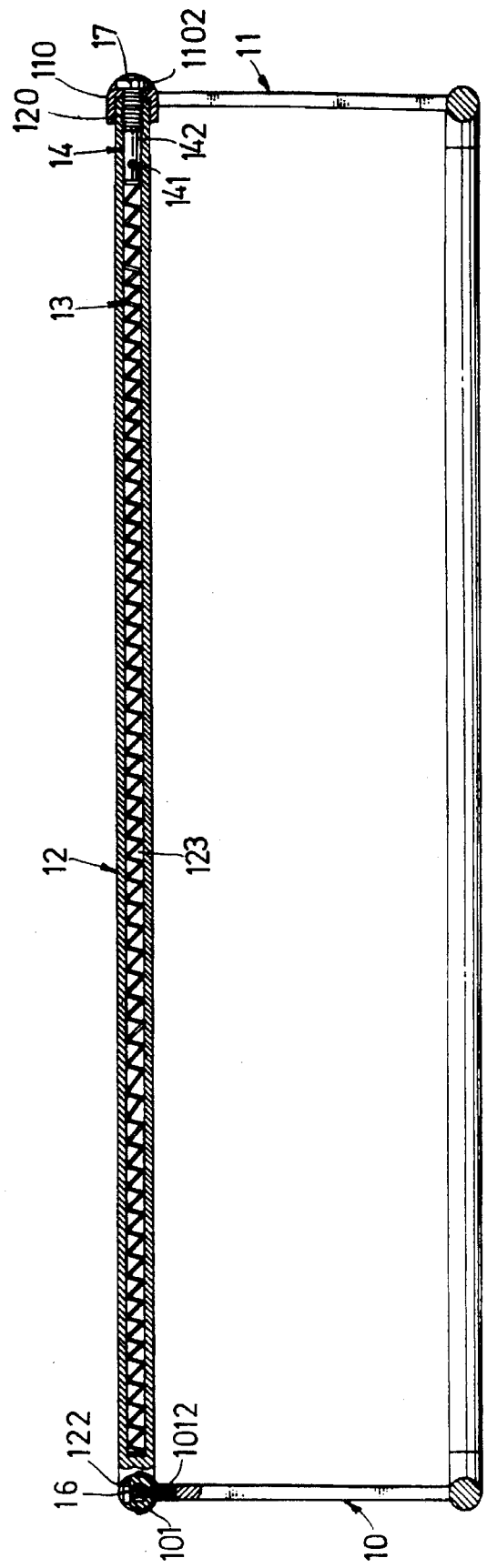
FIG. 3 is a sectional view of the video compact disk storage rack shown in FIG. 1, showing the installation of the expansion spring and the T-block in the open frame and the connection between the open frame and the end members.
Figure 6:
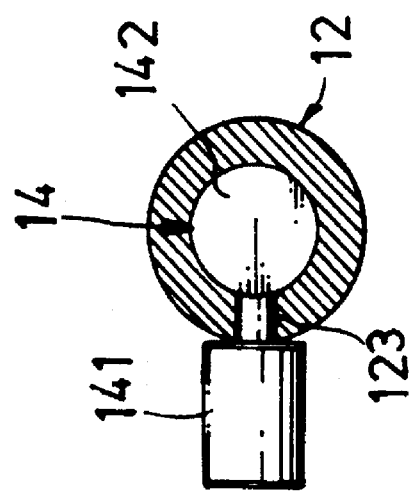
FIG. 6 is a sectional view showing the connection between the T-block and the open frame according to the present invention.

Referring to FIGS. 2 and 3, the first end member 10 comprises an upright 102, a horizontal channel bar 101 connected to the upright 102 at the top, a plurality of screw holes 1011 and 1012 on the horizontal channel bar 101, and two parallel screw rods 1021 and 1022 perpendicularly extended from the upright 102 at the bottom. The second end member 11 comprises an upright 111, a horizontal rod 110 connected to the upright 111 at the top and having two countersunk screw holes 1101 and 1102 at two opposite ends, and two extended from the upright 111 at the bottom. The connecting tubes 15 and 15' are respectively connected between the screw rods 1021 and 1022 of the first end member 10 and the screw rods 1121 and 1122 of the second end member 11. The open frame 12 is shaped like an open loop having a plurality of countersunk holes 121 and 122 at the close end thereof respectively connected to the screw holes 1011 and 1012 on the channel bar 101 of the first end member 10 by the respective screw 16, two screw holes 120 at two opposite ends thereof respectively connected to the countersunk holes 1101 and 1102 at the two opposite ends of the horizontal rod 110 of the second end member 11 by a respective screw 17, and two longitudinal sliding slots 123 bilaterally disposed on the inside. The expansion springs 13 are respectively mounted inside the open frame 12 at two opposite sides to push the T-blocks 14 toward the horizontal rod 110 of the second end member 11. The T-block 14 are respectively mounted in the open frame 12 and connected to the expansion spring 13 and moved along the longitudinal sliding slots 123, each comprised of an elongated mounting portion 142 disposed inside the open frame 12 and connected to one expansion spring 13 and an elongated retainer portion 141 perpendicularly connected to the elongated mounting portion 142 and extended out of the respective longitudinal sliding slot 123 for holding down video compact disks 2 (see also FIGS. 4 and 6).

Figure 5:
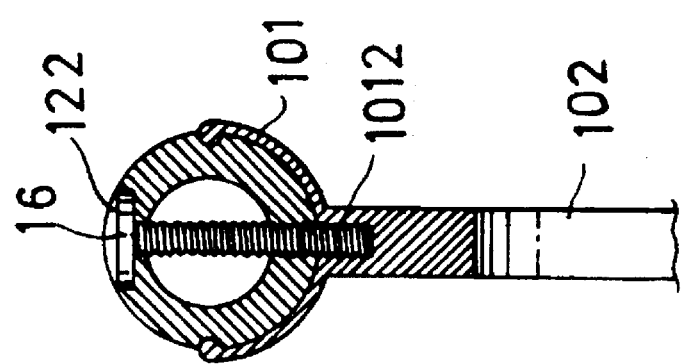
FIG. 5 is a sectional view showing the connection between the open frame and the first end member according to the present invention.

While only one embodiment of the present invention has been shown and described, it will be understood that various modifications could be made without departing from the spirit and scope of the invention. For example, raised portions may be made the channel bar 101 of the first end member 1 at opposite sides for retaining the close end of the open frame 12 in position (see FIG. 5); the first end member 10 and the second end member 11, and the connecting rods 15 and 15' may be integrally molded together.

I claim:

1. A video compact disk storage rack comprising:

a first end member, said first end member comprising an upright, a horizontal channel bar connected to the upright of said first end member at a top side, and a plurality of screw holes on said horizontal channel bar;

a second end member, said second end member comprising an upright, and a horizontal rod connected to the upright of said second end member at a top side, said horizontal rod having two countersunk hole at two opposite ends;

two connecting tubes respectively connected between the upright of said first end member and the upright of said second end member at a bottom side;

an open frame connected between said horizontal channel bar of said first end member and said horizontal rod of said second end member, said open frame comprising a transverse middle part supported on said horizontal channel bar of said first end member, two opposite ends respectively connected to the countersunk holes on said horizontal rod of said second end member, two longitudinal sliding slots bilaterally disposed on the inside between said horizontal channel bar and said horizontal rod, the transverse middle part of said open frame having a plurality of countersunk holes respectively connected to the screw holes on said horizontal channel bar of said first end member by a respective screw;

two expansion springs respectively mounted inside said longitudinal sliding slots; and two T-blocks respectively mounted on said open frame and supported on said expansion springs and moved along said longitudinal sliding slots on said open frame, each T-block comprising an elongated mounting portion disposed said open frame and connected to one expansion spring and an elongated retainer portion perpendicularly connected to said elongated mounting portion and extended out of the respective longitudinal sliding slot for holding down video compact disks within said open frame.

2. The video compact disk storage rack of claim 1 wherein said horizontal channel bar of said first end member has a plurality of raised portions at two opposite sides for retaining said open frame in place.

3. The video compact disk storage rack of claim 1 wherein said first end member and said second end member each has two parallel screw rods perpendicularly extended from the respective upright and connected to one end of each connecting rod.

4. The video compact disk storage rack of claim 1 wherein said first end member, said second end member, and said connecting rods are integrally molded together.

* * * * *